Aug. 14, 1962  R. P. DUMM  3,049,103
PRESSURE ACTUATED VALVE CONTROL
Filed May 1, 1961
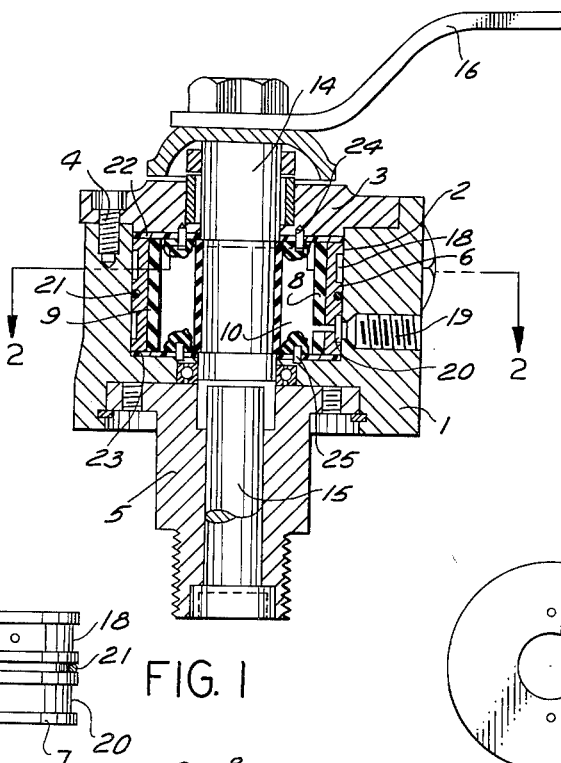
FIG. 1
FIG. 3
FIG. 4
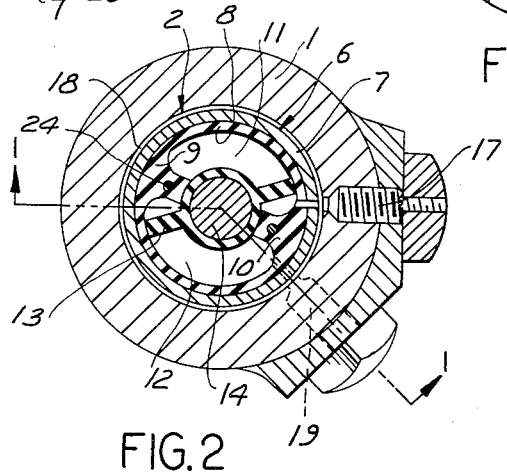
FIG. 2
INVENTOR.
ROBERT P. DUMM
BY
ATTORNEY

United States Patent Office 3,049,103
Patented Aug. 14, 1962

3,049,103
PRESSURE ACTUATED VALVE CONTROL
Robert P. Dumm, Long Beach, Calif., assignor to Pacific Valves, Inc., Long Beach, Calif., a corporation of California
Filed May 1, 1961, Ser. No. 106,675
3 Claims. (Cl. 121—99)

This invention relates to a mechanical operator which is attachable to a valve for the purpose of moving the rotating element of the valve to both open and closed positions from a point remote from the valve.

An object of my invention is to provide a novel pressure actuated operated valve control where both the impeller or movable member of the control, as well as the cylinder, include a rubber coating or wall which is bonded to a metal back; thus the impeller and the cylinder have a rubber to rubber seal and will more effectively operate over a long period of time without material leakage.

Another object of my invention is to provide a novel valve control in which the upper and lower faces of the impeller are sealed off by means of disks which are positioned within the body of the control, and which form the upper and lower walls of the pressure cavity within the body of the valve control.

Still another object of my invention is to provide a novel valve control in which the pneumatic conduits within the valve control are effectively separated so that pressure cannot leak from one intake port to another.

Other objects, advantages and features of invention may appear from the accompanying drawing, the subjoined detailed description and the appended claims.

In the drawing:

FIGURE 1 is a vertical sectional view of my pressure actuated valve control taken on line 1—1 of FIGURE 2.

FIGURE 2 is a horizontal sectional view taken on the line 2—2 of FIGURE 1.

FIGURE 3 is a side elevation of the cylinder element.

FIGURE 4 is a top plan view of one of the pressure plates.

Referring more particularly to the drawing the numeral 1 indicates the body of my valve control, and this body includes a cavity 2 therein. The upper end of this chamber is closed over a cap 3 which is suitably removably secured to the body 1 by means of suitable bolts, cap screws or the like 4. The lower end of the cavity 2 is closed by an adapter 5, and this adapter is attachable to the body of a valve (not shown). The adapter 5 will vary with different types of valves upon which the valve control might be mounted. An annular cylinder assembly 6 is nonrotatably mounted in the cavity 2 and this cylinder assembly includes an outer sleeve 7 formed of a suitable metal. An inner shell 8 is bonded to the metal cylinder 6 with present methods of bonding rubber to metal the two pieces are practically one homogeneous mass. The shell 8 is formed with two inwardly projecting walls 9 and 10 which divide the cylinder 6 into two chambers 11 and 12. The walls 9 and 10 are also formed of rubber integral with the remainder of the shell 8. An impeller 13 is bonded to the actuating shaft 14 and is thus practically a homogeneous part of the shaft. The inner portion of the impeller 13 is engaged by the innermost edges of the walls 9 and 10, thus providing a rubber to rubber contact at this point, and a more effective seal of possible leakage between the chambers 11—12. A drive shaft 15 is positioned within the adapter 5 and is suitably attached at one end to the lower end of the actuating shaft 14. Thus when the actuating shaft 14 is rotated the drive shaft 15 will also be rotated, and this drive shaft is suitably secured to the stem of a valve (not shown). A handle 16 may be secured to the actuating shaft 14 so that this shaft and the drive shaft 15 may both be manually rotated if the pneumatic power should fail.

To introduce pneumatic pressure into the chambers 11 and 12 I provide an intake port 17 which extends through the outer sleeve 7 and the shell 8, and thence into the chamber 11. To permit this entrance of pneumatic pressure the sleeve 7 is formed with an annular groove 18 therein. Similarly, to introduce pneumatic pressure into the chamber 12 I provide an intake port 19 which extends through the body 1 of the valve control and thence into the chamber 12. An annular groove 20 in the sleeve 7 permits the pneumatic fluid to pass around the sleeve to a position where the intake to the chamber 12 might be located. An O-ring 21, between the grooves 18 and 20, prevents leakage between these grooves while pressure is being applied in only one of the grooves.

To seal off the shell 8 and the impeller 13 at both the top and the bottom edges thereof, I provide a pair of pressure disks 22 and 23 which are nonrotatably pinned to the shell 8 by means of pins 24 and 25 respectively. The pressure disks 22 and 23 are each preferably formed of a very hard and dense plastic known as "Teflon," which is polytetrafluoroethylene. By means of these pressure disks leakage is avoided around the upper and lower edges of the impeller 13, and also to prevent leakage from one chamber 11 to the other chamber 12. The rubber contact with the Teflon pressure disks will also create an effective seal against such pressures as would be used in a valve control of this type.

Having described my invention, I claim:

1. A pressure actuated valve control comprising a body, said body having a cavity formed therein, a cylinder nonrotatably mounted in said cavity, said cylinder comprising an outer metallic sleeve and an inner nonmetallic shell bonded to said sleeve; an impeller formed of nonmetallic material rotatably mounted in said shell, an actuating shaft extending into the body and into said cylinder, said impeller being fixedly attached to the actuating shaft, a pair of inwardly extending walls projecting from the shell, the innermost faces of said walls slidably engaging the central portion of said impeller, said cylinder having a pair of chambers therein, one on each side of said walls, said outer sleeve having a pair of annular grooves formed in the outer face thereof, an O-ring in the sleeve arranged between said grooves, and a pair of pneumatic intake ports in the body, one port extending into each of said annular grooves and into each of the chambers.

2. A pressure actuated valve control comprising a body, said body having a cavity formed therein, a cylinder nonrotatably mounted in said cavity, said cylinder comprising an outer metallic sleeve and an inner nonmetallic shell bonded to said sleeve; an impeller formed of nonmetallic material rotatably mounted in said shell, an actuating shaft extending into the body and into said cylinder, said impeller being fixedly attached to the actuating shaft, a pair of inwardly extending walls projecting from the shell, the innermost faces of said walls slidably engaging the central portion of said impeller, said cylinder having a pair of chambers therein, one on each side of said walls, and a pneumatic intake port in the body extending into each of said chambers, and pressure disks nonrotatably mounted in said cavity, one on the top and one on the bottom of said cylinder.

3. A pressure actuated valve control comprising a body, said body having a cavity formed therein, a cylinder nonrotatably mounted in said cavity, said cylinder comprising an outer metallic sleeve and an inner nonmetallic shell bonded to said sleeve; an impeller formed of nonmetallic material rotatably mounted in said shell, an actuating shaft extending into the body and into said cylinder, said impeller being fixedly attached to the actuating shaft, a pair of inwardly extending walls projecting from the shell, the innermost faces of said walls slidably engaging the central portion of said impeller, said cylinder having a pair of chambers therein, one on each side of said walls, said outer sleeve having a pair of annular grooves formed in the outer face thereof, an O-ring in the sleeve arranged between said grooves, and a pair of pneumatic intake ports in the body, one port extending into each of said annular grooves and into each of the chambers, and pressure disks nonrotatably mounted in said cavity, one on the top and one on the bottom of said cylinder.

References Cited in the file of this patent

UNITED STATES PATENTS

| | | |
|---|---|---|
| 888,814 | Jones | May 26, 1908 |
| 1,965,564 | Bannister | July 10, 1934 |
| 2,016,067 | Bannister | Oct. 1, 1935 |
| 2,291,354 | Sibley | July 28, 1942 |
| 2,302,109 | Dodge | Nov. 17, 1942 |
| 2,314,493 | Guy | Mar. 23, 1943 |
| 2,339,042 | Anderson | Jan. 11, 1944 |
| 2,553,973 | Keller et al. | May 22, 1951 |
| 2,613,649 | Diebel | Oct. 14, 1952 |
| 2,780,432 | Shafer | Feb. 5, 1957 |